(12) United States Patent
Geser et al.

(10) Patent No.: US 11,578,976 B2
(45) Date of Patent: Feb. 14, 2023

(54) GEODETIC SYSTEM

(71) Applicant: LEICA GEOSYSTEMS AG, Heerbrugg (CH)

(72) Inventors: Markus Geser, Horn (CH); Daniel Hofstetter, St. Gallen (CH); Martin Mayer, Frastanz (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 241 days.

(21) Appl. No.: 16/997,841

(22) Filed: Aug. 19, 2020

(65) Prior Publication Data
US 2021/0055105 A1 Feb. 25, 2021

(30) Foreign Application Priority Data
Aug. 19, 2019 (EP) .................................... 19192411

(51) Int. Cl.
*G01C 15/06* (2006.01)
*G01C 15/00* (2006.01)

(52) U.S. Cl.
CPC .......... *G01C 15/06* (2013.01); *G01C 15/002* (2013.01)

(58) Field of Classification Search
CPC ....... G01C 15/06; G01C 15/002; G01C 15/00
See application file for complete search history.

(56) References Cited

U.S. PATENT DOCUMENTS

| | | | | |
|---|---|---|---|---|
| 5,828,057 A * | 10/1998 | Hertzman | ............... | G01S 17/04 250/225 |
| 6,369,755 B1 * | 4/2002 | Nichols | ................... | G01S 19/44 342/357.77 |
| 6,734,952 B2 * | 5/2004 | Benz | .................... | G01C 15/002 356/141.5 |

(Continued)

FOREIGN PATENT DOCUMENTS

DE 112012001709 B4 * 1/2016 .......... G01B 11/002
DE 10 2016 201 058 A1 7/2016
(Continued)

OTHER PUBLICATIONS

Extended European Search Report dated Mar. 5, 2020 as received in Application No. 19192411.7.

*Primary Examiner* — Nimeshkumar D Patel
*Assistant Examiner* — Tania Courson
(74) *Attorney, Agent, or Firm* — Maschoff Brennan

(57) ABSTRACT

A target of a geodetic system based on global and local identification references. The target comprises a light emitter (LE) for emitting n predetermined modulated light patterns (MLPs) permanently assigned to one of m (m>n) global identification reference (GIR). The target transmits or receives data based on the assigned GIR. The geodetic system further comprises a geodetic surveying instrument comprising an optical sensor (OS) receives the MLPs and digitizes them using a fast sampling analogue-to-digital converter (ADC). A computing system selects one of the targets or receives a selection of the at least one target (Continued)

assigned to a selected GIR. One of n local identification references (LIRs) is temporarily assigned to the selected GIR. The light emitter of the selected target is directed to emit an MLP corresponding with the assigned LIR. Thus, by detection of the assigned LIR, the selected target is identified.

15 Claims, 2 Drawing Sheets

(56) References Cited

U.S. PATENT DOCUMENTS

| | | | | |
|---|---|---|---|---|
| 7,145,648 B2* | 12/2006 | Vogel | ...................... | G01C 15/00 |
| | | | | 356/138 |
| 7,168,174 B2* | 1/2007 | Piekutowski | ......... | E01C 19/006 |
| | | | | 33/290 |
| 7,679,727 B2* | 3/2010 | Benz | .................... | G01C 15/002 |
| | | | | 356/4.01 |
| 7,804,051 B2 | 9/2010 | Hingerling et al. | | |
| 8,269,984 B2* | 9/2012 | Hinderling | .............. | G01S 17/14 |
| | | | | 356/5.1 |
| 8,553,212 B2* | 10/2013 | Jaeger | ................... | G01C 15/06 |
| | | | | 356/138 |
| 9,377,298 B2* | 6/2016 | Zogg | .................... | G01C 15/002 |
| 9,377,303 B2* | 6/2016 | Giger | ...................... | G01C 5/00 |
| 9,428,885 B2* | 8/2016 | Nau | ........................ | E02F 9/265 |
| 9,677,883 B2* | 6/2017 | Giger | .................... | G01S 7/4814 |
| 9,683,842 B2* | 6/2017 | Giacotto | .................. | G01C 3/08 |
| 9,864,061 B2* | 1/2018 | Giacotto | .................. | F41G 3/02 |
| 9,903,715 B2* | 2/2018 | Kotzur | .................. | H04N 7/183 |
| 9,939,263 B2* | 4/2018 | Green | ................. | G01C 15/002 |
| 9,970,762 B2* | 5/2018 | Möller | .................... | G01S 17/66 |
| 10,264,221 B2* | 4/2019 | Kumagai | .................. | G01S 7/481 |
| 10,310,054 B2* | 6/2019 | Troy | ......................... | G01S 5/16 |
| 11,280,896 B2* | 3/2022 | Hawker | .............. | G05D 1/0206 |
| 2018/0202805 A1* | 7/2018 | Unger | ................... | G01C 15/06 |
| 2019/0293761 A1* | 9/2019 | Hinderling | ........... | G01S 7/4808 |

FOREIGN PATENT DOCUMENTS

| | | |
|---|---|---|
| EP | 1 573 271 B1 | 2/2008 |
| EP | 1 891 397 B1 | 7/2013 |
| EP | 2 404 137 B1 | 4/2015 |
| EP | 3 169 975 B1 | 11/2018 |
| JP | H07-190773 A | 7/1995 |

* cited by examiner

GEODETIC SYSTEM

CROSS-REFERENCE TO RELATED APPLICATIONS

This application claims priority to European Patent Application No. 19192411.7, filed on Aug. 19, 2019. The foregoing patent application is herein incorporated by reference.

FIELD OF THE INVENTION

The present invention relates to a geodetic system comprising a geodetic surveying instrument, at least one target, and a computing system. A geodetic surveying instrument according to the invention is particularly chosen from one of a total station and a laser tracker. With that, the field of the invention is geodesy and industrial metrology.

BACKGROUND OF THE INVENTION

In the art of geodetic surveying, a common situation involves a surveying instrument being set up at a reference position and intended for being used to track or measure the position of one or more targets. A surveying instrument within the meaning of the present invention could be a total station or a laser tracker. Such devices are equipped with a steerable measuring beam that can measure a distance, e.g. based on the time of flight principle. Traditionally, a target merely reflects the measuring beam and is thus non-descriptive about the identity or type of target leaving the surveyor unknowing which target the surveying instrument is currently aiming at. Taking one step back, it has also been a manual procedure to locate the target in the first place and align the measuring beam onto the target.

Besides target identification by a user, which is cumbersome, time-consuming and error prone, there are several ways known to make sure that targets are automatically identifiable by the surveying instruments and that surveying instruments can be triggered to start a search for targets or even for one or more specific targets.

For instance, EP3169975B1 discloses identification of a target under motion using an image capturing a pattern by the target. The exposure time has to be longer than a regulating pattern. EP1573271B1 relates to target identification with a wireless response whereby a target needs a wireless communication unit operable to activate a selected total station. DE102016201058A1 teaches target identification wherein a reflective pattern on the target is needed. EP1891397B1 discloses target identification with an optical trigger and optical response whereby the target has to comprise an optical detector. EP2404137B1 shows target identification with an optical identification code and optical response wherein the surveying instrument emits sought ID and the target comprises a receiver to evaluate ID and a transmitter to send reactive confirmation.

However, besides some need for quite complicated additional equipment for target identification such as an active mirror or reflector or an optical receiver or photodetection device on side of the target, the prior art does not address the problem of managing the identifying and locating of targets in ultra-high speed and/or on-the-fly during an azimuth rotation, while fulfilling common surveying requirements in an appropriate way, such as robustness, reliability, and precision.

SUMMARY OF THE INVENTION

Some embodiments of the invention relate to a geodetic system comprising a geodetic surveying instrument, at least one target, and a computing system. Each of the at least one target comprises a light emitter (LE) configured for emitting any of n predetermined modulated light patterns (MLPs), e.g. intensity, carrier wavelength or polarity modulation, being permanently assigned to one of m global identification reference (GIR), e.g. MAC-address or Bluetooth address, wherein $m>n$, and configured for transmitting and/or receiving data based on the GIR to which it is assigned. The geodetic surveying instrument comprises an optical sensor (OS), e.g. a positive intrinsic negative (PIN) photodiode, a position sensitive detector (PSD), a Multi-Pixel Photon Counter (MPPC), a silicon photomultiplier (SiPM), configured for receiving the MLPs, an analogue-to-digital converter (ADC) configured for converting any of the MLPs into digitised signals. The computing system is configured for transmitting and/or receiving data based on a GIR, receiving data based on the digitised signals, selecting one of the at least one target or receiving a selection of one of the at least one target, the selected target being assigned to a selected GIR, temporarily assigning to the selected GIR one of n local identification references (LIRs), wherein each of the n LIRs is corresponding with one of the n MLPs, directing the light emitter of the selected target to emit an MLP corresponding with the assigned LIR, based on interpreting the digitised signals, detecting the assigned LIR, outputting a signal indicative for the detection of the selected target based on the detected assigned LIR.

The ADC particularly samples with at least Nyquist rate which is advantageous for fast LIR detection.

The computing system may comprise at least two components, wherein each of the components is comprised by one of: the surveying instrument (e.g. total station), the target, a remote server, and a hand-held computer, or wherein the computing system is comprised by one of: the surveying instrument, the target or at least one of the targets, a remote server, and a hand-held computer.

The computing system may be configured for automatically assigning one of the n LIRs based on a randomised algorithm, e.g. the geodetic surveying instrument or the target itself can (pseudo-)randomly choose an LIR out of the set of N LIRs when activated by the surveying instrument. Additionally or alternatively, the computing system may be configured for automatically assigning one of the n LIRs based on at least one former temporary assignation of a LIR different than the assigned LIR to a GIR different than the selected GIR.

The geodetic system or the computing system may further comprise a user interface for receiving the selection of one of the at least one target, and wherein the computing system is configured for receiving the selection of one of the at least one target from the user interface.

Each target may be configured for transmitting and/or receiving data based on an LIR, and wherein the computing system is configured for transmitting and/or receiving data based on an LIR.

The geodetic surveying instrument may be embodied as a total station, and comprises a base unit, a support unit mounted on the base unit and configured for being rotatable relative to the base unit around an azimuth axis, a targeting unit comprising a distance meter, the targeting unit being mounted on the support unit and configured for being rotatable relative to the support unit around an elevation axis, a first angle encoder configured for measuring a rotatory position of the support unit, and a second angle encoder configured for measuring a rotatory position of the targeting unit.

The optical sensor may be arranged in or on the support unit and has a field of view the alignment of which is linked to the rotatory position of the support unit.

The optical sensor may be arranged in or on the targeting unit and has an optical axis directed essentially parallel to a measuring axis of the distance meter, and has a vertically elongated form aligned perpendicular to the optical axis and to the elevation axis. Optionally, the optical sensor is one of a positive intrinsic negative (PIN) photodiode, a position sensitive detector (PSD), a Multi-Pixel Photon Counter (MPPC) or a silicon photomultiplier (SiPM).

The computing system is particularly configured for directing the support unit to rotate until the assigned LIR is detected. For instance, the field of view of the optical sensor is moved automatically until the light emitter is visible. The identification can take place statically after arrangement, or dynamically during motion of the field of view resp. during rotation of the support unit.

The computing system may be configured for determining an azimuthal coordinate in a coordinate system of the geodetic surveying instrument based on the rotatory position of the support unit at the time the assigned LIR is detected.

Optionally, the target or at least one of the targets comprises a retroreflector comprising the light emitter and the computing system is configured for directing the targeting unit at the retroreflector based on the detection of the assigned LIR. For example, the target primarily comprises the light emitter and is extended by a passive retro reflector mechanically linked with the light emitter, wherein the reflector is suitable for geodetic measurements, i.e. being measured by the surveying instrument with regards to distance and angle. Thus, the detection information is advantageously used to support a pointing procedure or locking onto the retro reflector after target detection as additional information or constraint or can even substitute prior art target search procedures, rendering additional search or locking units superfluous.

The optical sensor may be configured for outputting a vertical position information representing a location within the optical sensor where the MLP corresponding with the assigned LIR was received, and wherein the computing system is configured for determining an elevation coordinate in a coordinate system of the geodetic surveying instrument based on the vertical position information. For example, to obtain the elevation position of the target as well, a vertically sectorized field of view can be used, each field of view sector having an optical (sub-)sensor.

The optical sensor may be configured for receiving light with a characteristic wavelength, and wherein the light emitter is configured for emitting light with said characteristic wavelength. The wavelength is preferably within the (near-) infrared range such as 850 nm. Alternatively, the wavelength is in the visible range (monochrome).

The target or at least one of the targets, the surveying instrument, and the computing system may comprise a transceiver configured for exchanging data wirelessly.

The target or at least one of the targets may comprise an activation unit configured for activating the light emitter on demand, wherein the surveying instrument or the computing system is configured for transmitting the demand via the transceiver of the target or at least one of the targets.

Optionally, the system comprises multiple geodetic surveying instruments and is configured for execution of said detection of the selected target based on the detected assigned LIR simultaneously by at least two of said multiple geodetic surveying instruments. This is for example advantageous in a machine control use-case wherein more than one TPS shall track the same target on a machine.

Some embodiments of the present invention provide a geodetic system with a target comprising a light emitter emitting modulated light carrying a unique ID, enabling an automatic identification of the target on-the-fly, during the available speed of rotation of the geodetic surveying instrument. If for example the field of view of the optical sensor of the surveying instrument is "azimuth×elevation=3 mrad× 36°" and if the surveying instrument rotates with 50 gon/s, the light-emitter of the target will be within the FOV for about only 3.8 ms. However, the system provided herewith enables ultra-high speed identification; it is able to identify the target within this very short time span such as milliseconds. If for example a light pulse with a frequency of 500 kHz is used, within 1 ms 500 pulses are received which is sufficient for determining pulse frequency.

Target identification is possible both under static conditions of the target as well as dynamic conditions (relative movement of target and surveying instrument). The latter is particularly advantageous for surveying of targets mounted e.g. to a vehicle. The horizontal angle of an ID-device (target) can be determined without horizontal sensor resolution, i.e., with a single pixel in horizontal direction. When a very narrow but tall (vertically expanded) field of view is used at the optical sensor of the total station, a moving field of view resides only very briefly on the light emitter of the target. Since identification is very fast, the horizontal angle of a specific target can be detected by reading out the surveying instrument's angle encoder when the highest intensity from the light emitter is received. If the angle detector is synchronized with the computing system, the azimuth position of the target can be determined with an accuracy <3 mrad.

For a quick target search with the proposed target identification, the surveying instrument rotates horizontally until the desired target is found. Other passive retroreflectors or targets with wrong IDs are ignored in the process. The station does not need to stop at each target but acquires the necessary information "on the fly," thereby facilitating a quick target search process. Overall, due to the present invention, the time and user-effort until the station is locked onto a specific target is significantly reduced compared to known geodetic systems. In addition, during tracking operation, the station can verify whether it is locked onto the correct target.

The proposed system is user-friendly. It allows for an automatic target identification, whereby the ID selection is decoupled from the user. Once a target name is assigned, the user just searches for targets based on their target name (the station just identifies). The physically transmitted ID (i.e., modulated light, LIR) is of no concern to the user. The local ID is communicated among station and target via radio link.

Despite having a limited number of possible LIRs (e.g. pulse frequencies, spreading codes, Gold codes, or maximum length sequences), the proposed random assignment approach chooses different IDs with high probability. Therefore, a large number of targets can be used within a geodetic environment, given that only a few targets are identified (active) at the same time. The user does not need to remember which ID is used on which target.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
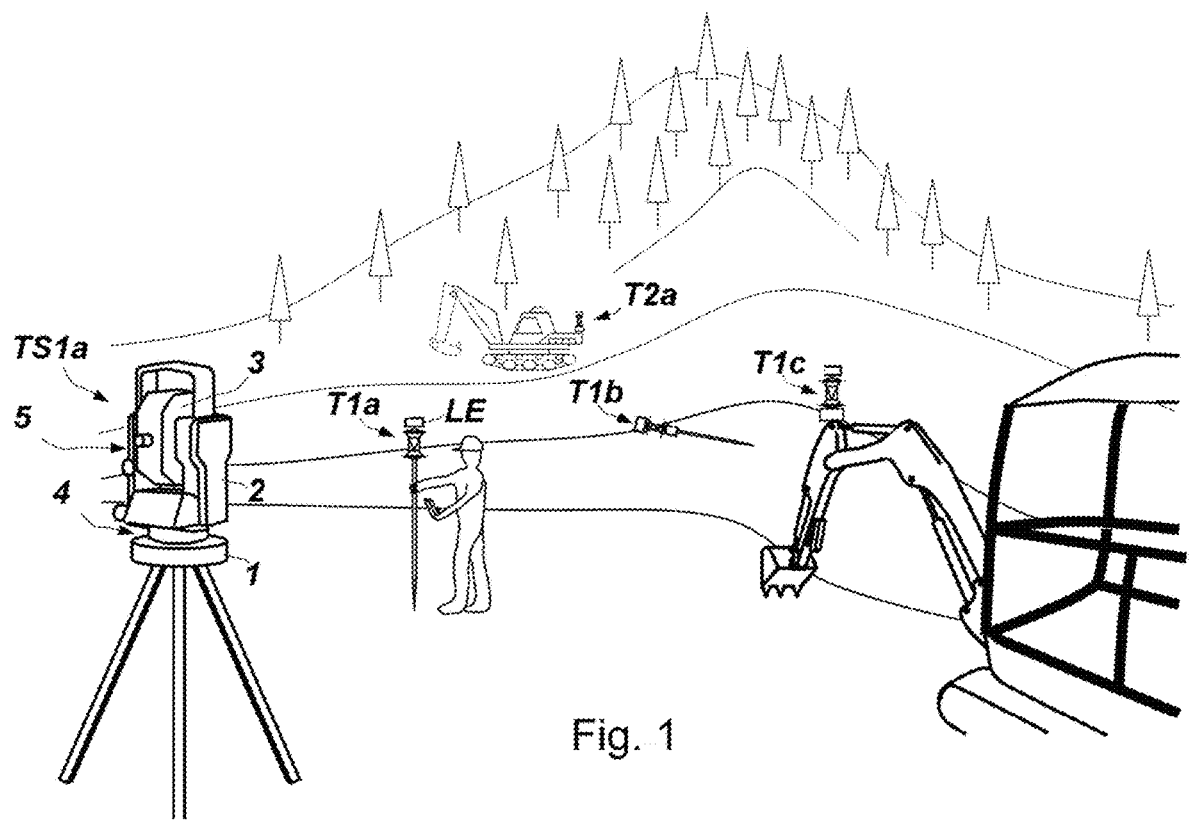
FIG. 1 shows one embodiment of a system according to the invention.

FIG. 1 shows an exemplary use case of an embodiment of the geodetic system according to the invention. On a construction site, a total station TS1$a$ is set up at a defined location and is operable to survey and/or track the positions of geodetic targets T1$a$, T1$b$, T1$c$, and T2$a$. The target T1$a$, which in the shown example is a selected target, is embodied as a surveying pole being designed to be hand-carried by a surveyor. The target T1$a$ is further wirelessly connected to a controller that can separately be hand-held. Target T1$b$ was left lying about because it is currently not in use. A further target T1$c$ is arranged on a digger to keep track of its shovel movement. In the background, another digger can be seen that carries a fourth target T2$a$. Each of the targets T1$b$, T1$c$, and T2$a$ is attached to a box underneath the reflector that encases a transmitter and/or a receiver. The transmitter and/or receiver can run on optical or wireless technology (e.g. infra-red, radio). In particular, the box is part of the respective target. The targets are all shown with a retroreflector, but the targets could also have a marker or a plate. All targets also have on top a light emitter LE indicated with an abstract box. The light emitter will be presented in more detail further below. The location however is not necessarily on top of the reflector, but can be at any place on the target. A location near the retroreflector can be used for an assignment to the retroreflector based on proximity and for identification of the target.

In the shown example, targets T1$a$, T1$b$, and T1$c$ "belong" to the area of the total station TS1$a$, but target T2$a$ does not. Target T2$a$ might belong to an area of a different total station or laser tracker. The targets T1$a$, T1$b$, and T1$c$ comprise the light emitter for emitting a modulated light pattern (MLP). The light can be emitted in a single optical state (wavelength/colour, direction or spatial arrangement), there is no need of several optical states. In this example, the three targets belonging to the circle of TS1$a$ are supposed to agree on which target will—upon demand—emit which one of three or more different MLPs available for this circle. Such three or more MLPs are specific and are corresponding with a respective local identification reference (LIR). In other words, there are three different LIRs that can be temporarily assigned to the three targets such that they are distinguishable. The targets are further permanently assigned to an unambiguous global identification reference (GIR), e.g. a Bluetooth address or any other unique code. By being "aware" of their own GIR, the targets can be activated from an external device, such as the total station TS1$a$. However, the targets can also send out information related to their GIR in order to communicate to an external device, such as the total station TS1$a$, that they want to be found or simply that they currently are assigned to a specific LIR.

There is only a limited number n of LIRs available, e.g. 2, 3, 4, in particular 8, or in some embodiments up to 99. The amount of GIRs, in contrast, is quasi infinite, because every device worldwide has a unique GIR. At least, however, the amount of GIR is above 99. The idea behind temporarily assigning a GIR to a LIR is that, due to the vast amount of different GIR, a LIR is a lot lower in data consumption, that is, to express the LIR with data and to represent it with an MLP is a lot easier to achieve, and most importantly, it is suitable for the applied technology and the speed thereof.

The total station TS1$a$ has an optical sensor designed to detect the MLPs, and an analogue-to-digital converter (ADC) for translating the MLPs into digitised signals. Then there is a computing system which can be one unit or comprise two or more units that all together count as computing system. Where necessary, the different units are interconnected by wire or wireless.

In this example, the total station TS1$a$ comprises a first unit of the computing system which acts as a transmitter and/or receiver for data based on a GIR and as a receiver for data based on the digitised signals. In other words, the first unit can, by interpreting (e.g. demodulating) the digitised signals, recognise the MLP and thus the LIR which is corresponding to the MLP.

The computing system in this example further comprises a second unit which is physically comprised by the controller of the selected target T1$a$ which is hand-held by the surveyor (and for the other targets: physically comprised by the boxes underneath the reflector of the target). This second unit can be provided at least for selecting a target (in particular: automatically), or receiving a selection of said target (e.g. via a graphical user interface (GUI)). In the shown example, the target T1$a$ is selected by the surveyor who tapped on his controller in order to make his selection and to give notice to the system about which type of target he holds in his hand based on the assigned unique GIR (selected GIR).

A third unit of the computing system is physically comprised by the total station TS1$a$. The third unit receives information about which GIR belongs to the target T1$a$ which was selected. The third unit then temporarily assigns a LIR to the selected GIR. Exemplarily, this assignation happens by an automatism. The total station TS1$a$ comprises a fourth unit of the computing system to keep a record of the current assignments and also of LIRs available in the system that are currently not assigned.

Said automatism can automatically choose one of the free LIRs, and if currently all LIRs are assigned, there could be a choice mechanism provided which gives priority to the assignations done just recently. For example, the assignation made the longest time ago will be dissolved, such that this LIR is set free and can be assigned to the selected target.

Since there is a fix correspondence between each LIR with an MLP, the computing system can now direct the light emitter of the selected target to emit a first MLP, which belongs to the LIR that was assigned to the selected GIR of the selected target T1$a$. The directing happens wirelessly since the unit of the computing system which is responsible for this directing is in this example not located in the target, but in the total station TS1$a$. The target now activates the light emitter and causes it to emit the specific MLP corresponding with the assigned LIR.

The ADC in the total station TS1$a$ now converts the MLP received by the optical sensor into a digitised signal, which is then interpreted by a fifth unit of the computing system in order to detect or identify the assigned LIR. Because of this detection, a sixth unit of the computing system physically comprised by the total station TS1$a$ can now output a signal on a display of the total station which indicates that the selected target has been detected.

So much about the configuration of the system and how the identification of a target works, but now let us have a look at the use case of locating the target. The total station TS1a in the situation shown in FIG. 1 is not "aware" of where the target T1a is located. It just "knows" that this target wants to be found, and of course it knowns which MLP it is sending out.

For being able to locate the selected target T1a, the total station TS1a can have a search mode. Laser trackers and total stations share roughly the same configuration, namely they have a base unit 1, a support unit 2 mounted on the base unit 1 and configured for being rotatable relative to the base unit 1 around an azimuth axis which is a substantially vertical axis. A targeting unit 3 is mounted on the support unit 2 such that it is rotatable relative to the support unit around an elevation axis which is a substantially horizontal axis. Further, the targeting unit 3 comprises a distance meter and it comprises the optical sensor for receiving the MLPs. The total station (just like a laser tracker) further has a first angle encoder 4 for measuring a rotatory position of the support unit, and a second angle encoder 5 configured for measuring a rotatory position of the targeting unit. With the two angle information and a measured distance, generic devices can determine 3D point coordinates. The optical sensor OS can be comprised by the targeting unit or the support unit.

Now, in said search mode, the total station performs a rotation around the azimuth axis such that the field of view of the optical sensor (see FIG. 2) detects a certain area, which is restricted by the angle of the field of view (FOV) and by the angle of rotation of the support unit. The search mode can comprise a full 360° search, or can only scan a part of that, e.g. 180°. The FOV of the optical sensor is—regarding azimuth—relatively narrow and—regarding elevation—relatively wide.

The elevation (vertical) FOV angle can be up to 180° wide, but usually is around 30-135° wide. Particularly, the elevation angle of the FOV is about 40°, more specifically between 30° and 38°. The azimuthal FOV angle is between 0.1° and 2° wide. This is due to the optical sensor preferably being a vertically elongated sensor, particularly one of a PIN (positive intrinsic negative) photodiode, a position sensitive detector (PSD), a Multi-Pixel Photon Counter (MPPC), a silicon photomultiplier (SiPM). In contrast to prior art approaches using image sensors such as CMOS sensors with exposure time requirements in the range of at least 100 ms, the configuration of the sensor (small area, low capacity) allows for an extremely fast sampling rate and thus also for a faster rotation of the total station during the search of targets, whereby in addition component costs are reduced and processing is simplified due to the use of such a single photo sensor compared to prior art. Preferably, the speed of rotation around the azimuth axis is at least 10 gon/s, in particular 40 gon/s, more specifically 50 gon/s, in some cases 100 gon/s, or even faster.

The optical sensor is designed to suit the MLP. The MLP in this example are sent out with a frequency of between 100 kHz and 1 MHz, i.e. the ADC satisfying the Nyquist criterion should sample with at least 2 MHz. That is also the reason why the duty cycle of the MLPs is very small (short pulse duration relative to the period of the waveform). In particular, the sampling rate of the ADC is at least 40 MHz, preferably 48 MHz, but in some embodiments the frequency might be even higher, e.g. up to 640 MHz. The characteristic wavelength of the MLP is around between 750 and 950 nm, in particular around 850 nm.

When the fan shaped FOV of the optical sensor is striking the MLP emitting emitter of the target T1a, the optical sensor detects the MLP, the ADC converts it into a digitised signal, and the LIR is interpreted by understanding the digitised signal. By permanently reading the first angle encoder, the azimuthal angle can be determined at the point in time when the MLP hit the sensor.

In particular, the vertically elongated sensor (either a PSD sensor, or an array of vertically arranged pixels) can also determine a vertical position within the sensor, where the MLP was detected. This is possible due to every position on the sensor being assigned to an elevation angle in the coordinate system of the total station TS1a. Like this, even a room angle (azimuth angle and elevation angle) of the position of the target T1a can be derived.

In a particular embodiment, the total station TS1a can also run a discovery mode in which the computing system is ready to detect not only one specific LIR, but two or more or all available LIRs, in one rotation movement. For this discovery functionality, the computing system is configured for directing the light emitter of each target to emit an MLP that is corresponding with an LIR that is temporarily assigned to the GIR of each of the targets.

Figure 2:
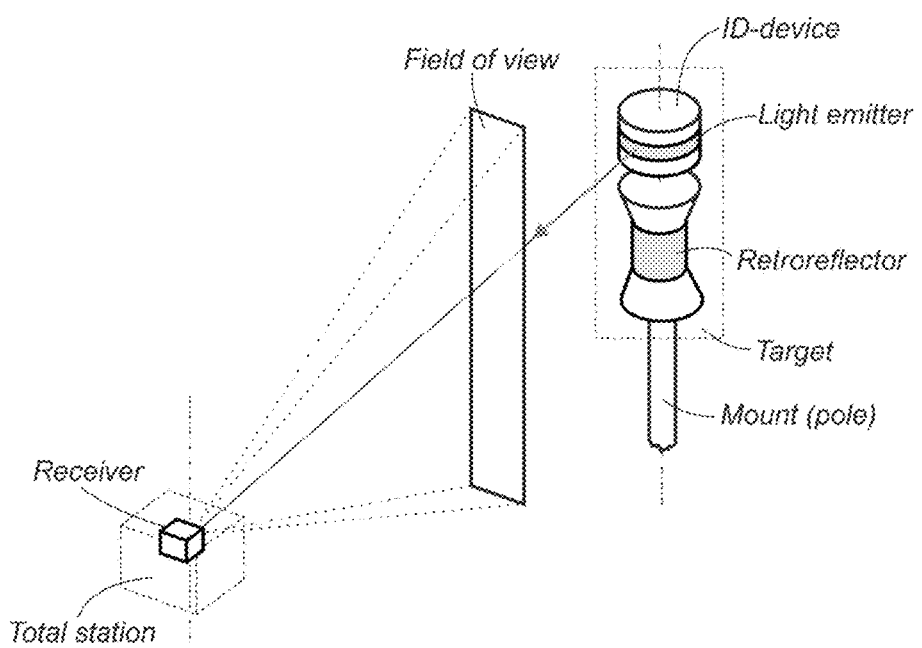
FIG. 2 shows one embodiment of a target of a system according to the invention.

A detail view of an exemplary target about to be detected by the rotating FOV of the optical sensor (receiver) is shown in FIG. 2. The target comprises a retroreflector and, in this embodiment, a light emitter arranged above the retroreflector, and a pole. Everything that is related to receiving, transmitting, computing is also packed into the box (ID-device) of the light emitter. For example, the target can wirelessly receive a request to answer by being called by its GIR. Then the target can be provided with the information about to which LIR it was assigned. The corresponding MLP being stored on the box of the target, the target now can be directed to emit the MLP corresponding to the assigned LIR.

Figure 3:
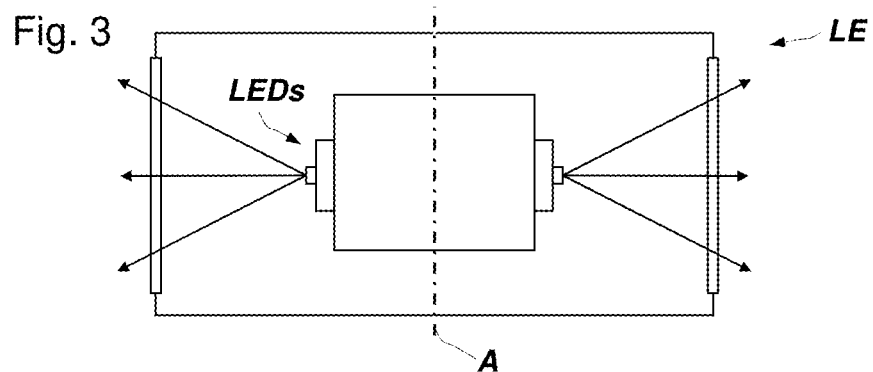
FIG. 3 shows one embodiment of a light emitter of a target of a system according to the invention.

FIG. 3 shows one embodiment of the light emitter LE which comprises Light Emitting Diodes (LEDs) or Vertical Cavity Surface Emitting Lasers (VCSELs) that are arranged to emit light in an azimuthal range substantially 360° around the indicated axis A and in an elevation range of substantially 60°. The shown light emitter has a housing with a 360° surround protection glass for allowing the MLPs to leave the housing. A 360°-radiation has the advantage that the target can be identified from all horizontal directions (target yaw invariance) and in a defined elevation angle such that tilted targets can be identified (target pitch or roll).

Figure 4:
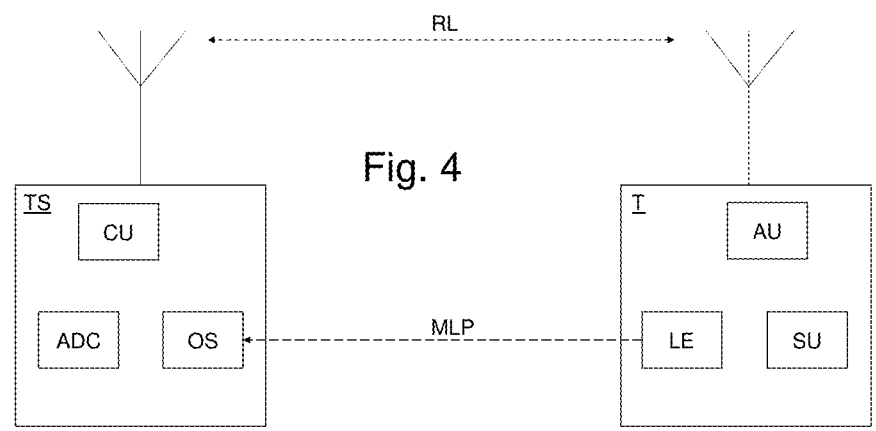
FIGS. 4, 5, and 6 show one embodiment of a constellation of a system according to the invention.

FIG. 4 shows an abstracted view of one embodiment of a coupling of a total station TS and a target T. They both can communicate with each other over a radio link RL like Bluetooth, but of course other technologies for this are also suitable, such as infra-red based communication. The total station TS comprises a computing unit CU which exemplarily combines all the functions of the computing system as described herein. With the optical sensor OS, it can receive an MLP from the light emitter LE of the target T, which are then converted into a digitised signal by the ADC. The target further has an activation unit AU and a selection unit SU. With the activation unit, the target T can be activated by the total station TS via the radio link RL. Such possibility to activate (and turn off) helps to save energy and extend battery life as the target has not to be active all the time but only when needed. This happens based on the GIR which is unambiguously assigned to the target T. The selecting unit SU on side of the target T then selects an LIR which is to be temporarily assigned to its GIR and reports this to the total station TS over the radio link RL. From then on, the target T sends out the MLP belonging to the assigned LIR and the total station TS "knows" which MLP to look out for.

Figure 5:
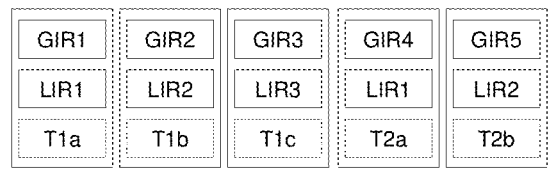
Figure 6:
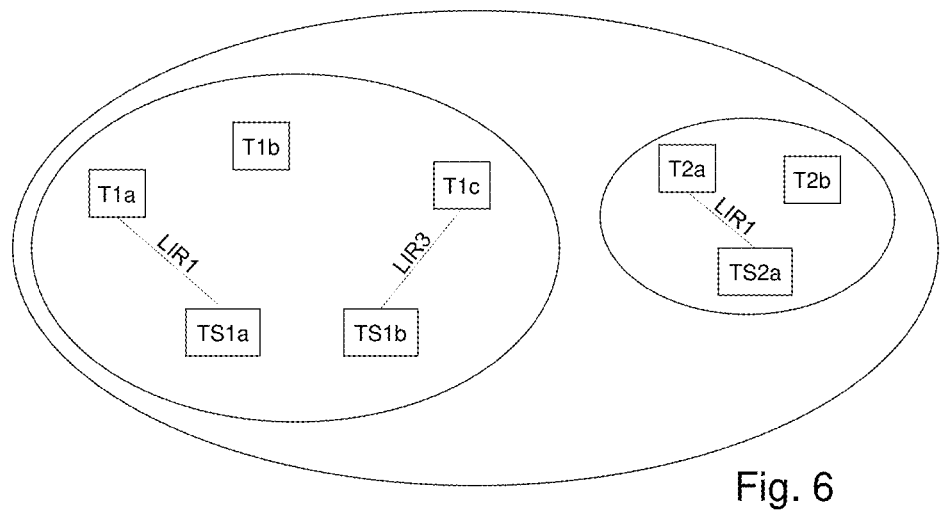

FIG. 5 gives an exemplary overview of the constellation as seen at least in part in FIG. 1: There are three targets T1a, T1b, and T1c relevant for a first area (see the left inner circle in FIG. 6). These three targets are dedicated for two different total stations TS1*a* and TS1*b*. These two total stations can coordinate among each other, which LIR they dedicate to which of the targets. As FIG. 6 shows, targets T1*b* and T2*b* are currently not assigned to an LIR. Target T2*a* does not belong to the circle of total station TS1*a*. It has for sure a different GIR than target T1*a*, but it might have the same LIR (in this case: LIR1) because LIRs are not unique, they are only unique in regard to their relevant local circle.

In an embodiment, the total stations from different circles (TS1*a* and TS1*b* on the one side, and TS2*a* on the other in the shown examples) can coordinate via wireless communication in order to avoid a simultaneous search for the same LIR which could accidentally lead to a conflict in case the respective target is within visual reach for surveying instruments from both circles. One of the two searches or discoveries would then be paused and continued when the search or discovery from the respective other circle is completed.

Although the invention is illustrated above, partly with reference to some preferred embodiments, it must be understood that numerous modifications and combinations of different features of the embodiments can be made. All of these modifications lie within the scope of the appended claims.

What is claimed is:

1. A geodetic system comprising:
    a geodetic surveying instrument, at least one target comprising a light emitter (LE) configured for emitting any of n predetermined modulated light patterns (MLPs), being permanently assigned to one of m global identification reference (GIR), wherein m>n, and configured for transmitting or receiving data based on the GIR to which it is assigned, the geodetic surveying instrument comprising:
    an optical sensor (OS) configured for receiving the MLPs,
    an analogue-to-digital converter (ADC) configured for converting any of the MLPs into digitised signals; and
    a computing system configured for:
        transmitting or receiving data based on a GIR,
        receiving data based on the digitised signals,
        selecting one of the at least one target or receiving a selection of one of the at least one target, the selected target being assigned to a selected GIR,
        temporarily assigning to the selected GIR one of n local identification references (LIRs), wherein each of the n LIRs is corresponding with one of the n MLPs,
        directing the light emitter of the selected target to emit an MLP corresponding with the assigned LIR,
        based on interpreting the digitised signals, detecting the assigned LIR, and
        outputting a signal indicative for the detection of the selected target based on the detected assigned LIR.

2. The geodetic system according to claim 1, wherein the ADC samples with at least Nyquist rate.

3. The geodetic system according to claim 1, wherein the computing system further comprises at least two components, wherein each of the components is comprised by one of: the surveying instrument, the target, a remote server, and a hand-held computer, or wherein the computing system is comprised by one of: the surveying instrument, the target or at least one of the targets, a remote server, and a hand-held computer.

4. The geodetic system according to claim 1, wherein the computing system is configured for automatically assigning one of the n LIRs
    based on a randomised algorithm, or
    based on at least one former temporary assignation of a LIR different than the assigned LIR to a GIR different than the selected GIR.

5. The geodetic system according to claim 1, wherein the geodetic system or the computing system further comprises a user interface for receiving the selection of one of the at least one target, and wherein the computing system is configured for receiving the selection of one of the at least one target from the user interface.

6. The geodetic system according to claim 1, wherein each target is configured for transmitting or receiving data based on an LIR, and wherein the computing system is configured for transmitting and/or receiving data based on an LIR.

7. The geodetic system according to claim 1, wherein
    the system comprises multiple geodetic surveying instruments and is configured for execution of said detection of the selected target based on the detected assigned LIR simultaneously by at least two of said multiple geodetic surveying instruments, or
    the optical sensor is configured for receiving light with a characteristic wavelength, and wherein the light emitter is configured for emitting light with said characteristic wavelength.

8. The geodetic system according to claim 1, wherein the target or at least one of the targets, the surveying instrument, and the computing system comprise a transceiver configured for exchanging data wirelessly.

9. The geodetic system according to claim 8, wherein the target or at least one of the targets comprises an activation unit configured for activating the light emitter on demand, wherein the surveying instrument or the computing system is configured for transmitting the demand via the transceiver of the target or at least one of the targets.

10. The geodetic system according to claim 1, wherein the geodetic surveying instrument is embodied as a total station, and comprises:
    a base unit,
    a support unit mounted on the base unit and configured for being rotatable relative to the base unit around an azimuth axis,
    a targeting unit comprising a distance meter, the targeting unit being mounted on the support unit and configured for being rotatable relative to the support unit around an elevation axis,
    a first angle encoder configured for measuring a rotatory position of the support unit, and
    a second angle encoder configured for measuring a rotatory position of the targeting unit.

11. The geodetic system according to claim 10, wherein the optical sensor is arranged in or on the support unit and has a field of view the alignment of which is linked to the rotatory position of the support unit.

12. The geodetic system according to claim 10, wherein the target or at least one of the targets comprises a retroreflector comprising the light emitter and the computing system is configured for directing the targeting unit at the retroreflector based on the detection of the assigned LIR.

13. The geodetic system according to claim 10, wherein the optical sensor:
    is arranged in or on the targeting unit and has an optical axis directed essentially parallel to a measuring axis of the distance meter, and has a vertically elongated form aligned perpendicular to the optical axis and to the elevation axis.

14. The geodetic system according to claim 13, wherein the computing system is configured for directing the support unit to rotate until the assigned LIR is detected.

15. The geodetic system according to claim 13, wherein the optical sensor is configured for outputting a vertical position information representing a location within the optical sensor where the MLP corresponding with the assigned LIR was received, and wherein the computing system is configured for:
  determining an elevation coordinate in a coordinate system of the geodetic surveying instrument based on the vertical position information.

* * * * *